(12) United States Patent
Aoki et al.

(10) Patent No.: US 9,193,034 B2
(45) Date of Patent: Nov. 24, 2015

(54) METHOD OF EXECUTING WATER JET PEENING

(71) Applicant: Hitachi-GE Nuclear Energy, Ltd., Hitachi-shi, Ibaraki (JP)

(72) Inventors: Takahiro Aoki, Mito (JP); Fujio Yoshikubo, Mito (JP); Akihiro Kanno, Hitachi (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 311 days.

(21) Appl. No.: 13/730,614

(22) Filed: Dec. 28, 2012

(65) Prior Publication Data

US 2013/0174627 A1    Jul. 11, 2013

(30) Foreign Application Priority Data

Jan. 5, 2012  (JP) .................................. 2012-000390

(51) Int. Cl.
| | |
|---|---|
| *B24C 1/10* | (2006.01) |
| *C21D 7/06* | (2006.01) |
| *C21D 9/08* | (2006.01) |
| *C21D 9/50* | (2006.01) |
| *G21C 19/20* | (2006.01) |
| *C21D 1/00* | (2006.01) |

(52) U.S. Cl.
CPC ... *B24C 1/10* (2013.01); *C21D 7/06* (2013.01); *C21D 9/08* (2013.01); *C21D 9/50* (2013.01); *G21C 19/207* (2013.01); *C21D 1/00* (2013.01)

(58) Field of Classification Search
CPC .......... B08B 9/02; B08B 9/021; B08B 9/023; B08B 9/093; G21C 19/02; G21C 13/00; G21C 13/036; G21D 1/00; C21D 7/06; G21Y 2002/103; G21Y 2004/20; G21Y 2004/202; B24C 1/10; B23P 17/00
USPC .............. 72/56, 710; 134/24, 167 R; 376/263
See application file for complete search history.

(56) References Cited

U.S. PATENT DOCUMENTS

| | | | | |
|---|---|---|---|---|
| 3,212,978 | A | * | 10/1965 | Short et al. .................... 376/234 |
| 4,064,000 | A | * | 12/1977 | Andrea .......................... 376/271 |
| 5,749,384 | A | * | 5/1998 | Hayashi et al. ........... 134/167 R |
| 5,913,320 | A | * | 6/1999 | Varrin et al. ............... 134/22.18 |
| 6,058,153 | A | | 5/2000 | Kurosawa et al. |
| 6,240,155 | B1 | | 5/2001 | Kurosawa et al. |

FOREIGN PATENT DOCUMENTS

| | | | |
|---|---|---|---|
| JP | 7-270590 | A | 10/1995 |
| JP | 9-136261 | A | 5/1997 |

(Continued)

*Primary Examiner* — Shelley Self
*Assistant Examiner* — Gregory Swiatocha
(74) *Attorney, Agent, or Firm* — Crowell & Moring LLP

(57) ABSTRACT

A top head of a reactor pressure vessel includes control rod drive mechanism (CRDM) penetration pipes arranged in a square grid-like pattern. The CRDM penetration pipes are joined with one another by a tube support member. The top head is placed on a tank and water is filled in an inner region of the tank and the top head. A travel apparatus moves a nozzle lifting and lowering apparatus to a predetermined location. A lifting and lowering mechanism of the nozzle lifting and lowering apparatus lifts a jet nozzle above the tube support member among the neighboring four CRDM penetration pipes. An ejection outlet of the jet nozzle is directed to a weld between one of the CRDM penetration pipes and the top head, and a water jet is ejected. A nozzle turning mechanism turns the jet nozzle, and WJP is executed sequentially to the four CRDM penetration pipes.

8 Claims, 7 Drawing Sheets

(56) References Cited

FOREIGN PATENT DOCUMENTS

| | | | |
|---|---|---|---|
| JP | 09136261 A | * | 5/1997 |
| JP | 10-10282 A | | 1/1998 |
| JP | 2000-308927 | | 11/2000 |
| JP | 2000308927 A | * | 11/2000 |
| JP | 3530005 B2 | | 3/2004 |

* cited by examiner

METHOD OF EXECUTING WATER JET PEENING

CLAIM OF PRIORITY

The present application claims priority from Japanese Patent application serial no. 2012-000390, filed on Jan. 5, 2012, the content of which is hereby incorporated by reference into this application.

BACKGROUND OF THE INVENTION

1. Technical Field

The present invention relates to a method of executing water jet peening and, in particular, to a method of executing water jet peening suitable for structural members of a nuclear power plant.

2. Background Art

In a nuclear power plant, when there exists tensile residual stress on a surface of a weld of a structural member of a reactor and a surface of its heat-affected zone, water jet peening (hereinafter referred to as WJP) is executed to the weld and heat-affected zone of the structural member to improve the tensile residual stress to compressive residual stress on the surface of the structural member.

The WJP is executed by immersing the structural member whose residual stress is to be improved in water and ejecting a high-pressure water jet from a nozzle disposed in the water. Cavitation bubbles contained in the water jet ejected in the water at high pressure are collapsed, so that shock waves are generated. These shock waves collide against a surface of the structural member in the water. As a consequence, the tensile residual stress on the surface of the structural member is improved to compressive residual stress. The structural member added with compressive residual stress can reduce occurrence of stress corrosion cracking (SCC).

An example of executing WJP to a core shroud in a reactor pressure vessel composing a reactor is stated in Japanese Patent No. 3530005. Furthermore, examples of executing WJP to a tubular member provided to a reactor pressure vessel are stated in Japanese Patent Laid-Open No. 7(1995)-270590, Japanese Patent Laid-Open No. 9(1997)-136261, Japanese Patent Laid-Open No. 10(1998)-10282, and Japanese Patent Laid-Open No. 2000-308927. In the methods of executing the WJP stated in Japanese Patent Laid-Open No. 7(1995)-270590, Japanese Patent Laid-Open No. 10(1998)-10282, and Japanese Patent Laid-Open No. 2000-308927 each use, a WJP apparatus provided with a nozzle for ejecting a water jet is attached to the tubular member (for example, a control rod drive mechanism housing) provided to the reactor pressure vessel. On the other hand, the method of executing the WJP stated in Japanese Patent Laid-Open No. 9(1997)-136261 uses a WJP apparatus provided with a nozzle for ejecting a water jet, which is attached to a moving apparatus.

In the methods of executing the WJP stated in Japanese Patent Laid-Open No. 7(1995)-270590 and Japanese Patent Laid-Open No. 10(1998)-10282, the WJP apparatus is attached to a control rod drive mechanism housing provided to the reactor pressure vessel. The WJP apparatus has a tubular body and a jet nozzle which is attached on the tubular body and rotatable in the circumferential direction of the tubular body. The WJP apparatus is inserted in the reactor pressure vessel and installed to a control rod drive mechanism housing by attaching the tubular body to the control rod drive mechanism housing. The WJP apparatus is immersed in cooling water filled in the reactor pressure vessel. The jet nozzle ejecting high-pressure water turns around the tubular body, and thus the high-pressure water jet is ejected from the jet nozzle to an outer surface of the control rod drive mechanism housing which is a WJP execution object and to which the WJP apparatus was attached. Cavitation bubbles contained in the ejected water jet are collapsed, as a consequence, the shock waves generate. These shock waves collide against the outer surface of the control rod drive mechanism housing, and the tensile residual stress of the outer surface is improved to compressive residual stress. Adjacent to the control rod drive mechanism housing to which the WJP apparatus is attached, there are other control rod drive mechanism housings and in-core monitor housings (hereinafter referred to as ICM housings). The water jet is also ejected from the jet nozzle to each outer surface of the other control rod drive mechanism housings and the ICM housings. As a result, compressive residual stress can be given to the outer surfaces of the other control rod drive mechanism housings and the ICM housings.

The method of executing the WJP stated in Japanese Patent Laid-Open No. 2000-308927 uses the WJP apparatus provided with an oscillatable jet nozzle for ejecting a water jet that is high-pressured water supplied, a WJP body installed with the jet nozzle, and a base plate to which the WJP body is removably mounted. When the WJP is executed to an ICM housing using this WJP apparatus, the base plate is mounted to two control rod drive mechanism housings adjacent to the ICM housing executing the WJP, and a water jet is ejected to the outer surface of the ICM housing from the oscillating jet nozzle provided to the WJP body installed to the base plate. At this time, the WJP body is located on a central axis of one of the control rod drive mechanism housings, and compressive residual stress is given to a circumferential half of the outer surface of the ICM housing being the WJP execution object by ejecting the water jet from the oscillating jet nozzle attached to the WJP body. This WJP body is moved to a position on the central axis of the other control rod drive mechanism housing and installed to the base plate. In this state, the oscillating jet nozzle ejects a water jet to the ICM housing. This allows compressive residual stress to be given to the entire periphery of the ICM housing.

According to the method of executing the WJP stated in Japanese Patent Laid-Open No. 9(1997)-136261, a WJP apparatus has a moving carriage; a lifting carriage provided to the moving carriage; a rotary drive axis having a spline structure on an outside, rotatably attached to the lifting carriage; a rotating tube surrounding the rotary drive axis, engaged with the spline structure; a lifting flange attached to a lower end portion of the rotating tube, held to the lifting carriage; and a jet nozzle attached to a rotating plate provided to an upper end portion of the rotating tube. A WJP execution object is an upper cover of a pressure vessel provided with a plurality of pipes, and is supported by a supporting member. The moving carriage moves below the upper cover, this moving carriage places a positioning head provided to the upper end portion of the rotary drive axis directly below a pipe being a WJP execution object, and the lifting carriage is lifted to insert the positioning head in the pipe. A cylindrical cover whose inner surface is in contact with an outer periphery of the rotating plate is lifted by an air cylinder installed to the lifting carriage so that the upper end of the cylindrical cover contacts the upper cover and the cylindrical cover surrounds the pipe. The lifting flange is lifted to lift the jet nozzle to make an ejection outlet of the jet nozzle face a weld between the upper cover and the pipe installed to the upper cover. Water is filled inside the cylindrical cover above the rotating plate, and the pipe installed to the upper cover is immersed into the water. The jet nozzle ejects a water jet into the water in the cylindrical cover toward the weld between the upper cover and the pipe. The rotary drive axis rotates, making the jet nozzle turn around the pipe as ejecting a water jet. Compressive residual stress is given to the surface of the weld.

CITATION LIST

Patent Literature

[Patent Literature 1] Japanese Patent No. 3530005
[Patent Literature 2] Japanese Patent Laid-Open No. 7(1995)-270590
[Patent Literature 3] Japanese Patent Laid-Open No. 9(1997)-136261
[Patent Literature 4] Japanese Patent Laid-Open No. 10(1998)-10282
[Patent Literature 5] Japanese Patent Laid-Open No. 2000-308927

SUMMARY OF THE INVENTION

Technical Problem

According to Japanese Patent Laid-Open No. 7(1995)-270590, Japanese Patent Laid-Open No. 9(1997)-136261, and Japanese Patent Laid-Open No. 10(1998)-10282, the jet nozzle ejecting a water jet turns around a WJP execution object, that is, a tubular member provided to the upper cover of a reactor pressure vessel, and compressive residual stress is given to the entire periphery of the tubular member. However, when the upper cover bristles with the plurality of tubular members which are joined in all directions by a tube support member, the jet nozzle cannot be turned around the tubular member as done in the methods of executing the WJP stated in Japanese Patent Laid-Open No. 7(1995)-270590, Japanese Patent Laid-Open No. 9(1997)-136261, and Japanese Patent Laid-Open No. 10(1998)-10282 due to the existence of the tube support member. As a consequence, this reduces efficiency of the WJP execution.

When the jet nozzle is turned around the tubular member provided to the upper cover, that is, a WJP execution object, as stated in these publications, the following operations are necessary. The jet nozzle is horizontally turned until a nozzle support member supporting and turning with the jet nozzle hits the tube support member joining tubular members, so that the WJP is executed to a quarter periphery of the tubular member. After completion of the WJP, the jet nozzle is moved in the axial direction of the tubular member to a position lower than the tube support member where a top of the jet nozzle does not hit the tube support member, then, the jet nozzle is turned with the nozzle support member, moving under the tube support member, to a position where the jet nozzle does not hit the tube support member. Then, the jet nozzle is moved in the axial direction of the tubular member and returned to the position of executing the WJP to the tubular member above the tube support member. The jet nozzle ejecting a water jet is turned around in the circumferential direction of the tubular member until the nozzle support member hits the adjacent part of the tube support member.

Such movement of the jet nozzle is repeated for every quarter periphery of all the tubular members for executing the WJP. Thus, the WJP can be executed to the entire periphery of the tubular member. All this makes the jet nozzle to be repeatedly moved in the axial direction of the tubular members, lengthening the time required for WJP execution.

When the method of executing WJP described in Japanese Patent Laid-Open No. 2000-308927 is applied to the above tubular members, after WJP is executed to a half periphery of a tubular member, the WJP body having the jet nozzle must be remounted to a different position on the base plate. In this remounting also, the WJP body must be moved in the axial direction of the tubular member, in the same manner as in the previous three publications, due to the tube support member joining neighboring tubular members. This lengthens the time required for the WJP execution because of the move of the WJP body in the axial direction of the tubular member.

An object of the present invention is to provide a method of executing water jet peening which can shorten the time required for executing water jet peening.

Solution to Problem

A feature of the present invention for attaining the above object comprises steps of filling water in an upper cover provided with a plurality of tubular members arranged in a rectangular grid-like pattern and restrained horizontal movement by a rectangular lattice-like tube support member; moving a jet nozzle in the axial direction of the tubular member toward an inner surface of the upper cover from the tube support member through a first opening formed by the tube support member; and then, executing water jet peening sequentially to four tubular members facing the first opening and held by the tube support member, by turning the jet nozzle ejecting a water jet.

Since the jet nozzle is moved in the axial direction of the tubular member toward the inner surface of the upper cover from the tube support member through the one opening formed by the tube support member, and then, the water jet peening is sequentially executed to four tubular members facing the one opening and held by the tube support member, by turning the jet nozzle ejecting a water jet, even when the upper cover provided with the plurality of tubular members arranged in a rectangular grid-like pattern and restrained horizontal movement by a rectangular lattice-like tube support member, the time required for executing the water jet peening to the plurality of tubular members can be shortened.

Advantageous Effect of the Invention

The present invention can shorten the time required for executing water jet peening.

DETAILED DESCRIPTION OF THE PREFERRED EMBODIMENTS

Embodiments of the present invention will be described below.

Embodiment 1

A method of executing water jet peening according to embodiment 1, which is a preferred embodiment of the present invention, will be described with reference to FIGS. 1 to 8.

Figure 1:
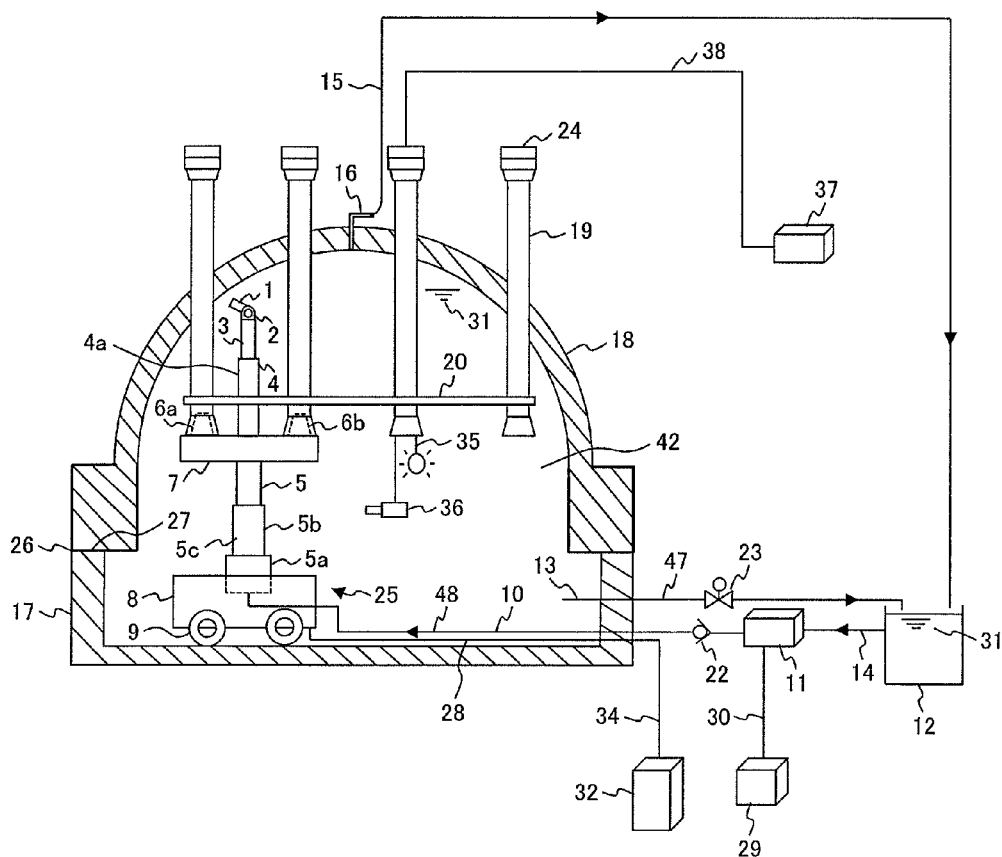
FIG. 1 is a structural view showing a water jet peening apparatus used in a method of executing water jet peening according to embodiment 1, which is a preferred embodiment of the present invention.
Figure 2:
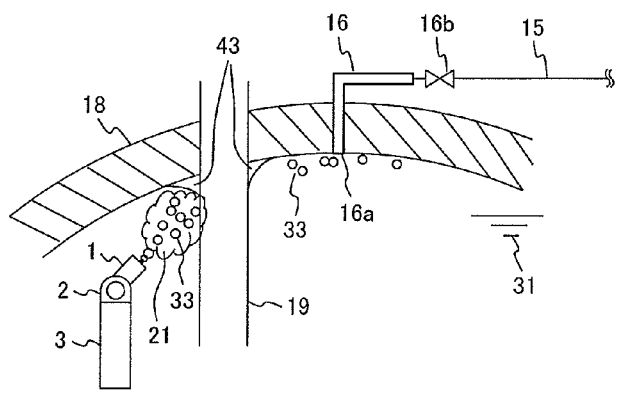
FIG. 2 is an explanatory drawing showing a state when water jet peening is executed by ejecting a water jet from a jet nozzle toward a control rod drive mechanism penetration pipe according to the method of executing water jet peening in embodiment 1.

First of all, a water jet peening apparatus used in the method of executing water jet peening according to the present embodiment will be described with reference to FIG. 1. A water jet peening apparatus (hereinafter referred to as a WJP apparatus) 25 is provided with a jet nozzle 1, a nozzle lifting/lowering apparatus 4, a positioning guide lifting/lowering apparatus 5b, a positioning guide 7, a travel apparatus 8, a water supply apparatus 10, and a drain apparatus 13. The nozzle lifting/lowering apparatus 4 is installed to the travel apparatus 8 having a plurality of wheels 9. The nozzle lifting/lowering apparatus 4 has a nozzle angle adjusting mechanism 2, a nozzle turning mechanism (a turning apparatus) 3, and a lifting/lowering mechanism 4a. The lifting/lowering mechanism 4a has a first tubular body (not shown), a cylinder (not shown) provided in the first tubular body, and a piston (not shown) disposed in the cylinder. The lower end portion of the first tubular body is fixed to a top surface of the travel apparatus 8 and the first tubular body extends vertically up from the travel apparatus 8. The nozzle turning mechanism 3 is attached to the piston. The nozzle angle adjusting mechanism 2 to which the jet nozzle 1 is attached is attached to the nozzle turning mechanism 3. The jet nozzle 1 is turned up or down by the nozzle angle adjusting mechanism (angle adjusting apparatus) 2, so that an angle of the jet nozzle 1 can be adjusted in the vertical direction.

The positioning guide lifting/lowering apparatus 5b has a rotating mechanism 5a, a lifting/lowering mechanism 5c, and a second tubular body 5. The rotating mechanism 5a is rotatably installed to the travel apparatus 8. The lifting/lowering mechanism 5c is installed to the rotating mechanism 5a, and the second tubular body 5 is installed to the lifting/lowering mechanism 5c. The positioning guide 7 provided with positioning members 6a and 6b is installed to an upper end portion of the second tubular body 5. The positioning guide 7 is, for example, a rectangular flat plate. The first tubular body of the lifting/lowering mechanism 4a is disposed inside the rotating mechanism 5a, the lifting/lowering mechanism 5c, and the second tubular body 5.

A water supply apparatus 10 has a high pressure pump 11, a high pressure hose 48, and a water supply hose 14. The water supply hose 14 is connected to a water storage tank 12 and the high pressure pump 11. The high pressure hose 48 connected to the high pressure pump 11 is fixed to the travel apparatus 8, the lifting/lowering mechanism 4a and the nozzle turning mechanism 3, and connected to the jet nozzle 1. A check valve 22 is provided to the high pressure hose 48. The drain apparatus 13 has a drain pipe 47 and a pressure adjusting valve 23 and the pressure adjusting valve 23 is provided to the drain pipe 47. The drain pipe 47 is connected to the water storage tank 12.

Figure 3:
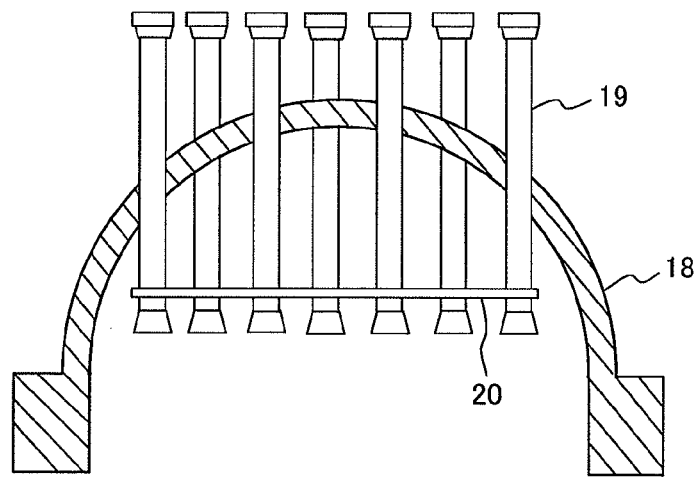
FIG. 3 is a longitudinal sectional view showing an upper cover, which is a water jet peening execution object in embodiment 1.

In a pressurized-water reactor, a plurality of control rod drive mechanism penetration pipes (hereinafter referred to as CRDM penetration pipes) 19 are welded to a top head 18 installed to a reactor pressure vessel (see FIG. 3). When the top head 18 is installed to the reactor pressure vessel, it becomes an upper cover of the reactor pressure vessel. These CRDM penetration pipes 19 are arranged in a rectangular grid-like pattern, for example, in a square grid-like pattern (see FIG. 4) and penetrate the top head 18. When the top head 18 is installed to the reactor pressure vessel, a control rod drive mechanism (not shown) is disposed in the CRDM penetration pipe and installed to the CRDM penetration pipe. Adjacently disposed CRDM penetration pipes 19 are joined to each other by a square lattice-shaped tube support member 20 in the top head 18, that is, at portions inside the reactor pressure vessel (see FIGS. 1 and 5). The tube support member 20 has a plurality of ring members 20A and a plurality of linear joining members 20B. The ring members 20A each forming a penetration hole are arranged in a square grid-like pattern. The joining members 20B are each disposed between the ring members 20A and join neighboring ring members 20A. The joining members 20B with the ring members 20A constitute the square lattice-shaped tube support member 20. Each CRDM penetration pipe 19 is separately inserted through the penetration hole of each ring member 20A. The ring members 20A and the joining members 20B are joined by welding (or by bolts and nuts) and support and fix the CRDM penetration pipes 19. The ring members 20A and the joining members 20B for supporting and fixing the CRDM penetration pipes 19 work as a stabilizer for reducing resonance due to vibration during reactor operation.

The tube support member 20 forms a plurality of cells, that is, a plurality of rectangular regions (rectangular openings) 44. One rectangular region 44 is surrounded by neighboring four ring members 20A and four joining members 20B joining these ring members 20A. The one rectangular region 44 is faced by four CRDM penetration pipes 19 penetrating the four ring members 20A.

After completion of an operation cycle, a pressurized-water reactor is shut down for a periodic inspection of the pressurized-water reactor. After the operation of the pressurized-water reactor is stopped, the top head 18 is removed from the reactor pressure vessel by using a ceiling crane (not shown) to exchange part of a plurality of fuel assemblies loaded in the core for fresh fuel assemblies. The removed top head 18 is moved to a predetermined location in the reactor building by the ceiling crane, and placed curved side up on a tank 17 placed in a predetermined location on a floor, the tank 17 is a support member for the top head 18. The top head 18 is joined to the tank 17 by bolts. A seal member 27 is disposed to a contact portion 26 between the top head 18 and the tank 17. An upper end portion of each CRDM penetration pipe 19 is closed by a stop plug 24.

The travel apparatus 8 installed with a jet nozzle 1, the nozzle lifting/lowering apparatus 5, etc. is disposed in the tank 17. A cable 28 connected to a travel control apparatus 32 penetrates a side wall of the tank 17 while keeping airtightness of the tank 17 and connected to the travel apparatus 8. A pump control apparatus 29 is connected to the high pressure pump 11 by a cable 30. The travel control apparatus 32 and the pump control apparatus 29 are connected to an operation board (not shown) by cables (not shown) for sending control commands. The drain pipe 47 of the drain apparatus 13 is connected to the tank 17, communicating to an inner region 42 of the tank 17. An underwater camera 36 and an underwater light 35 are disposed in the inner region 42 surrounded by the tank 17 and the top head 18 and installed to one of the CRDM penetration pipes 19. A cable 38 connected to the underwater camera 36 runs through the CRDM penetration pipe 19 installed with the underwater camera 36, penetrates the stop plug 24, is taken out of the top head 18, and is connected to a display apparatus 37. Cables for supplying power to the underwater camera 36 and the underwater light 37, although not shown in the figure, run through the CRDM penetration pipe 19 and penetrate the stop plug 24 to be taken outside.

A vent pipe 16 is connected to a top portion of the top head 18. This vent pipe is used for discharging air existing in the reactor pressure vessel when the reactor pressure vessel installed with the top head 18 is filled with cooling water to prepare for the operation of the pressurized-water reactor. When the WJP is executed to the top head 18, a drain hose 15 having an opening/closing valve 16b (see FIG. 2) is connected to the vent pipe 16. The drain hose 15 extends to the water storage tank 12.

The method of executing water jet peening according to the present embodiment using the WJP apparatus 25 will be described. While the travel apparatus 8 is disposed in the inner region 42, water 31 in the water storage tank 12 is supplied into the inner region 42 using a water supply apparatus not shown in the figure and the water 31 is filled in the inner region 42. When the water 31 flows out through the vent pipe 16 and the drain hose 15 into the water storage tank 12, the inner region 42 is filled with the water 31, so the supply of the water 31 into the inner region 42 is stopped.

While the jet nozzle 1 is located below the tube support member 20, an operator inputs a travel apparatus moving command into the operation board. This travel apparatus moving command is inputted from the operation board to the travel control apparatus 32. The travel control apparatus 32 sends a travel control signal based on the inputted travel apparatus moving command through the cable 28 to a motor (not shown) for turning the wheels 9 provided to the travel apparatus 8. The motor rotates and the travel apparatus 8 is moved. When a turning center of the nozzle turning mechanism 3 is positioned directly below a intersection of two diagonal lines of one rectangular region 44 (see FIGS. 5 and 6) surrounded by four ring members 20A and four joining members 20B of the tube support member 20 joining the four CRDM penetration pipes 19 to which the WJP are executed, and then, horizontal movement of the travel apparatus 8 is stopped. Whether the travel apparatus 18 has been moved to the predetermined location, that is, whether the nozzle turning mechanism 3 has been moved in the horizontal direction to the predetermined location can be checked by looking at an image displayed on the display apparatus 37, which is taken by the underwater camera 36. The underwater light 35 is turned on while the underwater camera 36 shoots images.

After the turning center of the nozzle turning mechanism 3 is positioned directly below the intersection of two diagonal lines of the rectangular region 44, compressed air is supplied into the cylinder provided in the tubular body of the lifting/lowering mechanism 4a to push the piston up. The compressed air is supplied into the cylinder by opening an opening/closing valve (not shown) provided to a compressed air supply hose (not shown) communicated to the cylinder. The opening/closing valve is controlled by the travel control apparatus 32. The jet nozzle 1 and the nozzle turning mechanism 3 passes through the rectangular region 44 and reach a space above the tube support member 20 (see FIG. 5).

Areas for executing WJP on the four CRDM penetration pipes 19 facing the rectangular region 44 are a weld between each CRDM penetration pipe 19 and the top head 18. These welds have different heights from the bottom surface of the tank 17 because the top head 18 has a curved surface (see FIGS. 1 and 3). The jet nozzle 1 is lifted by the lifting/lowering mechanism 4 to a height near a weld between one of the four CRDM penetration pipes 19 (for example, the CRDM penetration pipe 19 in location A in FIG. 6) and the top head 18. The jet nozzle 1 is stopped from being lifted when it is lifted to the vicinity of the height. After that, the nozzle angle adjusting mechanism 2 and the nozzle turning mechanism 3 are operated and the jet nozzle 1 is rotated in the vertical and the horizontal directions to make an ejection outlet of the jet nozzle 1 face the weld between that one CRDM penetration pipe 19 and the top head 18. When the ejection outlet of the jet nozzle 1 is facing the weld between the CRDM penetration pipe 19 and the top head 18, the rotations of the jet nozzle 1 are stopped. Starting and stopping the operations of the nozzle angle adjusting mechanism 2 and the nozzle turning mechanism 3 are controlled based on control signals outputted from the travel control apparatus 32.

As will be described later, the positioning guide 7 is lifted by the lifting/lowering mechanism 5c of the positioning guide lifting/lowering apparatus 5b, and the positioning members 6a and 6b of the positioning guide 7 are separately inserted into respective lower end portions of two CRDM penetration pipes 19 located on a diagonal line of the rectangular region 44 among the four CRDM penetration pipes 19 facing the rectangular region 44. When the positioning members 6a and 6b are inserted into the respective lower end portions of the two CRDM penetration pipes 19, the positioning guide 7 is stopped from being lifted by the lifting/lowering mechanism 5c. Starting and stopping the operation of the lifting/lowering mechanism 5c also are controlled based on a control signal outputted from the travel control apparatus 32. When the positioning members 6a and 6b are not located directly below the two CRDM penetration pipes 19 for receiving the positioning members, the rotating mechanism 5a is operated to rotate the lifting/lowering mechanism 5c and the second tubular body 5 so that the positioning guide 7 is turned to place the positioning members 6a and 6b directly below the two CRDM penetration pipes 19 mentioned above. Starting and stopping the operation of the rotating mechanism 5a also are controlled based on a control signal outputted from the travel control apparatus 32.

The operator inputs a pump drive command into the operation board. This pump drive command is inputted to the pump control apparatus 29, and outputs a drive control signal to the high pressure pump 11. The high pressure pump 11 is started, and the water 31 in the water storage tank 12 is pressurized by the high pressure pump 11 and introduced to the jet nozzle 1 through the high pressure hose 48. The water 31 pressurized to become high-pressure water is ejected from the jet nozzle 1 into water 31 in the inner region 42 as a water jet 21 toward the CRDM penetration pipe 19 in the location A. The water jet 21 contains numerous cavitation bubbles 33 (see FIG. 2). The cavitation bubbles 33 contained in the water jet 21 are collapsed, as a consequence, shock waves are generated. These shock waves propagate through the water 31 in the inner region 42 and collide against the surface of the weld between the CRDM penetration pipe 19 in the location A and the top head 18 and the surface of a heat-affected zone around the weld. This gives compressive residual stress to the surface of the weld and the heat-affected zone. The jet nozzle 1 turns clockwise in FIG. 6 by the nozzle turning mechanism 3 while ejecting the water jet 21. This gives compressive residual stress to the surface of the weld and the heat-affected zone in a quarter periphery (hereinafter referred to as a quarter region) 40 of the CRDM penetration pipe 19 in the location A facing the jet nozzle 1 of the nozzle lifting/lowering apparatus 4. The quarter region 40 is a part of a circumferential area for executing the WJP (the weld to the top head 18 and the heat-affected zone around it) on the CRDM penetration pipe 19 in the location A.

Part of the cavitation bubbles 33 rises in the water 31 in the inner region 42 without being collapsed during the ejection of the water jet 21 from the jet nozzle 1, and accumulates in the vicinity of the inner surface of the top head 18. If air accumulation 43 is formed by the cavitation bubbles 33 in the vicinity of the weld between the CRDM penetration pipe 19 and the top head 18, the WJP cannot be executed to the weld. In order to avoid such situation, the opening/closing valve 16b is opened while the jet nozzle 1 is ejecting the water jet 21. Since uncollapsed cavitation bubbles 33 are discharged through the vent pipe 16 to the drain hose 15 and introduced to the water storage tank 12, the uncollapsed cavitation bubbles 33 are not collected in the vicinity of the inner surface of the top head 18.

When the pressure in the inner region 42 is increased by the ejection of the water jet 21 from the jet nozzle 1, the pressure adjusting valve 23 is opened and part of the water 31 in the inner region 42 is discharged to the water storage tank 12 through the drain pipe 47. The pressure in the inner region 42 is measured by a pressure meter (not shown) installed to the tank 17.

After the WJP is completed to the CRDM penetration pipe 19 in the location A, the WJP is executed to the surface of a weld between the CRDM penetration pipe 19 in location B and the top head 18 and the surface of its heat-affected zone. During the period from the time when the ejection outlet of the jet nozzle 1 horizontally turns away from the CRDM penetration pipe 19 in the location A to the time when it faces the CRDM penetration pipe 19 in the location B, the lifting/lowering mechanism 4a adjusts the position of the jet nozzle 1 in the axial direction of the CRDM penetration pipe 19 to make the jet nozzle 1 come to the height near the weld between the CRDM penetration pipe 19 in the location B and the top head 18. When the water jet 21 is ejected from the jet nozzle 1 turning clockwise toward the weld between the CRDM penetration pipe 19 in the location B and the top head 18 and the heat-affected zone, shock waves generated by collapsed cavitation bubbles 33 contained in the water jet 21 collide against the surface of the weld between the CRDM penetration pipe 19 in the location B and the top head 18 and the surface of the heat-affected zone around the weld. This gives compressive residual stress to the surface of the weld and the heat-affected zone in the quarter region 40 of the CRDM penetration pipe 19 in the location B facing the jet nozzle 1.

When the jet nozzle 1 is turned to direct the ejection outlet of the jet nozzle 1 toward each CRDM penetration pipe 19 in the locations C and D, the position of the jet nozzle 1 is adjusted in the axial direction of the CRDM penetration pipe 19 by the lifting/lowering mechanism 4a in the same manner as for the CRDM penetration pipe 19 in the location B. Then, by the effect of the cavitation bubbles 33 contained in the water jet 21 ejected from the jet nozzle 1, compressive residual stress is given to the surface of the weld and the heat-affected zone in the quarter region 40 of each CRDM penetration pipe 19 in the locations C and D facing the jet nozzle 1.

The positioning of the jet nozzle 1 in the axial direction of the CRDM penetration pipe 19 corresponding to each weld between the CRDM penetration pipe 19 and the top head 18 is achieved by the travel control apparatus 32 controlling the lifting/lowering mechanism 4a as above. Information on the height from the bottom surface of the tank 17 to each weld between the CRDM penetration pipe 19 and the top head 18 is stored in memory of the travel control apparatus 32. The travel control apparatus 32 acknowledges the four CRDM penetration pipes 19 for executing the WJP based on a coordinate (an X-coordinate value and a Y-coordinate value) of the intersection of two diagonal lines of the rectangular region 44 where the nozzle lifting/lowering apparatus 4 of the travel apparatus 8 is positioned, controls the lifting/lowering mechanism 4a based on the information on the order of WJP execution to the four CRDM penetration pipes 19 and the height of each weld stored in the memory, and positions the jet nozzle 1 in the axial direction of the CRDM penetration pipe 19 corresponding to each weld.

Figure 6:
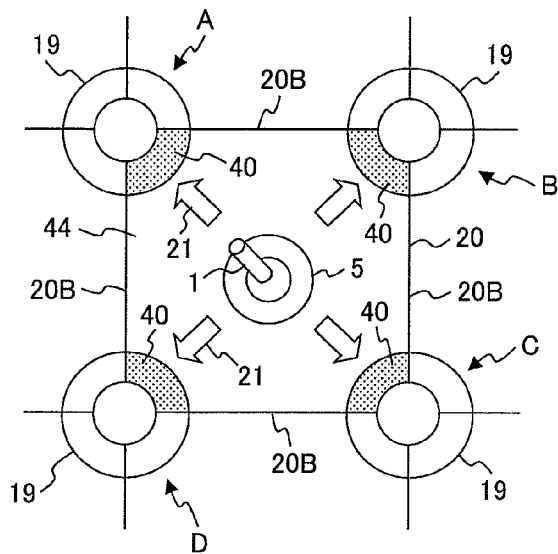
FIG. 6 is an explanatory drawing showing ejection of a water jet from a jet nozzle to a plurality of control rod drive mechanism penetration pipes according to a method of executing water jet peening in embodiment 1.
Figure 7:
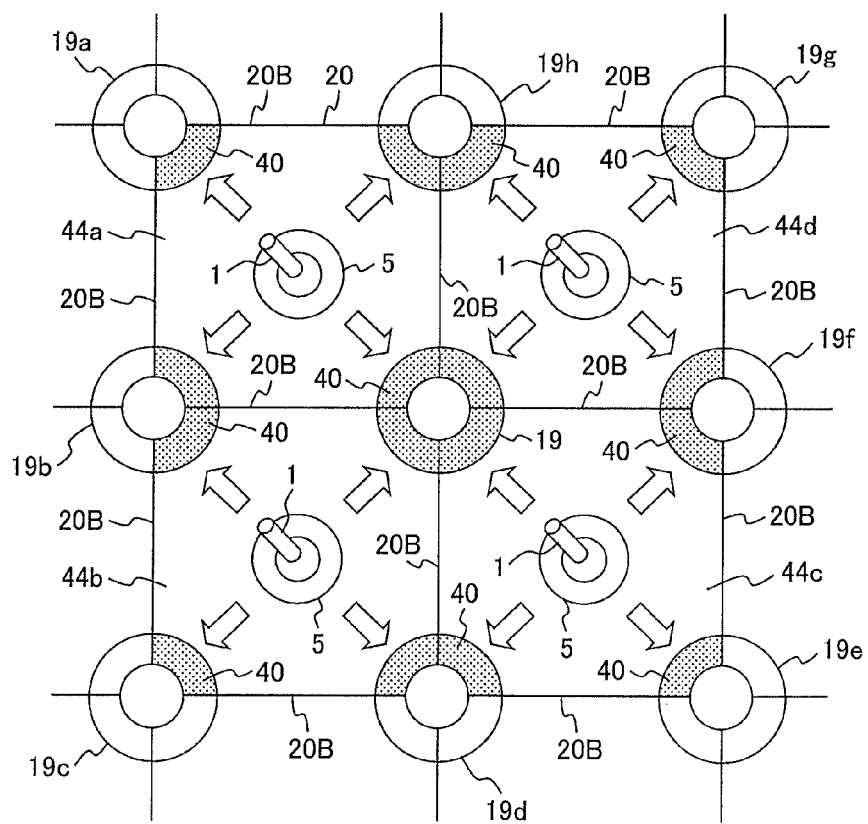
FIG. 7 is an explanatory drawing showing execution of water jet peening to each of control rod drive mechanism penetration pipes arranged in a rectangular grid-like pattern according to a method of executing water jet peening in embodiment 1.
Figure 8:
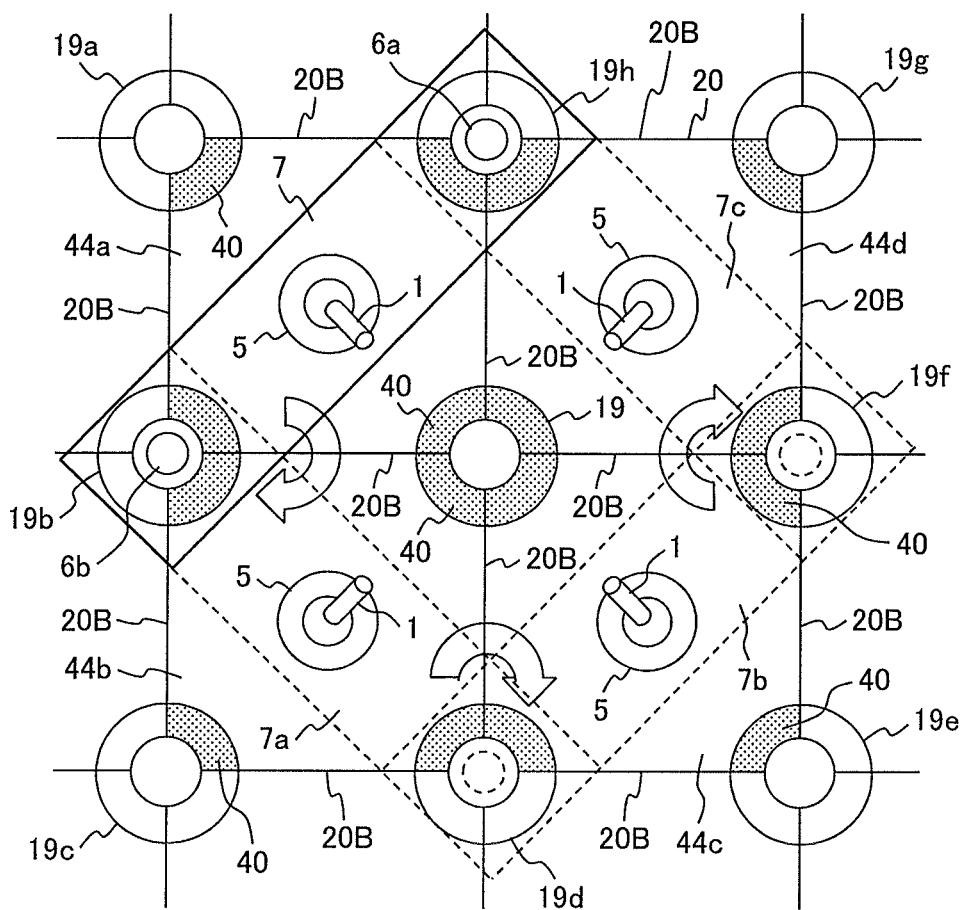
FIG. 8 is an explanatory drawing showing positioning of a water jet peening apparatus during water jet peening according to a method of executing water jet peening in embodiment 1.

After the above WJP is completed to the four CRDM penetration pipes 19 in one rectangular region 44, the WJP is executed to four CRDM penetration pipes 19 in another rectangular region 44. This WJP execution will be described with reference to FIGS. 7 and 8. Assume that the four CRDM penetration pipes 19 in the rectangular region 44 shown in FIG. 6 are four CRDM penetration pipes 19a, 19b, 19, and 19h in a rectangular region 44a in FIG. 7. When the WJP is executed to these four CRDM penetration pipes 19a, 19b, 19, and 19h, the lifting/lowering mechanism 5c of the positioning guide lifting/lowering apparatus 5b is operated and the positioning guide mechanism 7 is lifted. As shown in FIG. 8, the positioning members 6a and 6b of the positioning guide 7 are inserted into the lower end portions of the CRDM penetration pipe 19h and 19b respectively. This holds the axis of the nozzle lifting/lowering apparatus 4, particularly that of the nozzle turning mechanism 3 to the intersection of two diagonal lines of the rectangular region 44a. In this state, the WJP is executed as described above to the welds between the four CRDM penetration pipes 19 (the CRDM penetration pipes 19, 19a, 19b, and 19h) and the top head 18 in one rectangular region 44 shown in FIG. 6 (the rectangular region 44a shown in FIG. 7).

After the WJP execution is completed to each quarter region 40 facing the jet nozzle 1 on the CRDM penetration pipes 19a, 19b, 19, and 19h in the rectangular region 44a, the jet nozzle 1 is lowered to a position lower than the tube support member 20 by the operation of the lifting/lowering mechanism 4a. The lifting/lowering mechanism 5c is operated and the positioning guide mechanism 7 is lowered. The positioning member 6a and 6b are withdrawn from the lower end portions of the CRDM penetration pipes 19h and 19b respectively. After the positioning members 6a and 6b are withdrawn from the CRDM penetration pipes 19h and 19b and the jet nozzle 1 is lowered below the tube support member 20, the travel apparatus 8 is moved to position the axis of the nozzle turning mechanism 3 directly below the intersection of two diagonal lines of a rectangular region 44b. When the axis of the nozzle turning mechanism 3 matches the intersection in the rectangular region 44b, the travel apparatus 8 is stopped from being moved. The lifting/lowering mechanism 4a is operated. The jet nozzle 1 and the nozzle turning mechanism 3 are lifted through the rectangular region 44b to a position higher than the tube support member 20. In the same manner as in the rectangular region 44a, by the operation of the nozzle angle adjusting mechanism 2 and the nozzle turning mechanism 3, angles of the jet nozzle 1 in the vertical and horizontal directions are adjusted to direct the ejection outlet of the jet nozzle 1 toward the weld between the CRDM penetration pipe 19b and the top head 18 in the rectangular region 44b. At this time, the rotating mechanism 5a is turned to position the positioning guide 7 to a location 7a shown in FIG. 8, and the positioning guide 7 is lifted by the lifting/lowering mechanism 5c to insert the positioning member 6a and 6b of the positioning guide 7 into the lower end portions of the CRDM penetration pipes 19b and 19d respectively. As a result, the axis of the nozzle lifting/lowering apparatus 5 is held by the positioning guide 7 on the intersection of two diagonal lines of the rectangular region 44b.

Then, while the jet nozzle 1 is ejecting the water jet 21, the nozzle turning mechanism 3 turns the jet nozzle 1, and as the jet nozzle 1 is adjusted in the axial direction of the CRDM penetration pipe 19 to a height of the weld between each of the four CRDM penetration pipes 19b, 19, 19d, and 19c and the top head 18 in the rectangular region 44b, as described in FIG. 6. The WJP is executed sequentially to the welds of these CRDM penetration pipes. As a result, the WJP is executed to each quarter region 40 facing the nozzle turning mechanism 3 of the weld between each of the CRDM penetration pipes 19b, 19, 19d, and 19c and the top head 18 and its heat-affected zone.

After completion of the WJP execution to the four CRDM penetration pipes 19b, 19, 19d, and 19c in the rectangular region 44b, the WJP is executed to each weld between each of four CRDM penetration pipes 19, 19f, 19e, and 19d and the top head 18 in a rectangular region 44c; after completion of the WJP execution to these CRDM penetration pipes, the WJP is executed to each weld between each of four CRDM penetration pipes 19h, 19g, 19f, and 19 and the top head 18 in a rectangular region 44d sequentially in the same manner as in the rectangular regions 44a and 44b. When the WJP is to be executed to the four CRDM penetration pipes in the rectangular region 44c, the positioning guide 7 is placed in a location 7b shown in FIG. 8 by the rotating mechanism 5a, and by operating the lifting/lowering mechanism 5c, the positioning members 6a and 6b of the positioning guide 7 are inserted into the lower end portions of the CRDM penetration pipes 19d and 19f respectively. When the WJP is to be executed to the four CRDM penetration pipes in the rectangular region 44d, the positioning guide 7 is placed in a location 7c shown in FIG. 8 by the rotating mechanism 5a, and by operating the lifting/lowering mechanism 5c, the positioning members 6a and 6b of the positioning guide 7 are inserted into the lower end portions of the CRDM penetration pipes 19f and 19h respectively.

When the WJP execution is completed to each quarter region 40 facing the jet nozzle 1 on the four CRDM penetration pipes in each of the rectangular regions 44a, 44b, 44c, and 44d, the WJP is executed to the entire periphery of the weld to the top head 18 and the surrounding heat-affected zone of the CRDM penetration pipe 19 contained in the four rectangular regions (the CRDM penetration pipe 19 surrounded by the CRDM penetration pipes 19a to 19h). In the method of executing water jet peening according to the present embodiment, the nozzle lifting/lowering apparatus 4 is inserted through one rectangular region 44 and the jet nozzle 1 ejecting the water jet 21 is turned, allowing the WJP execution to only a quarter region 40 facing the jet nozzle 1 on each of four CRDM penetration pipes 19 facing the rectangular region 44. However, by executing WJP to the four CRDM penetration pipes in all rectangular regions 44, the WJP can be executed to the entire periphery of the weld of the CRDM penetration pipe included in the four rectangular regions 44, as described above.

The jet nozzle 1 is turned to direct the axis of the jet nozzle 1 toward the outer surface of the CRDM penetration pipe 19 in the tangential direction. In such situation, the water jet 21 is ejected from the jet nozzle 1, so that in this WJP, a wraparound effect of the cavitation bubbles 33 (see FIGS. 6 and 7 in Japanese Patent Laid-Open No. 7(1995)-270590) can be used. For this reason, the WJP can be executed to the entire periphery of the CRDM penetration pipe 19 by ejecting the water jet 21 from two directions, that is, from the rectangular regions 44a and 44c to the CRDM penetration pipe 19.

Figure 4:
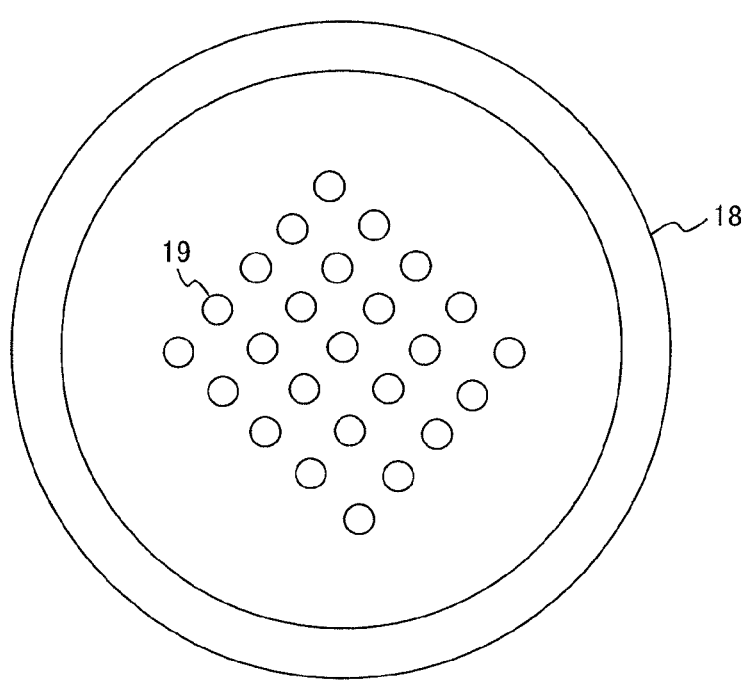
FIG. 4 is a floor plan showing an upper cover shown in FIG. 3.
Figure 5:
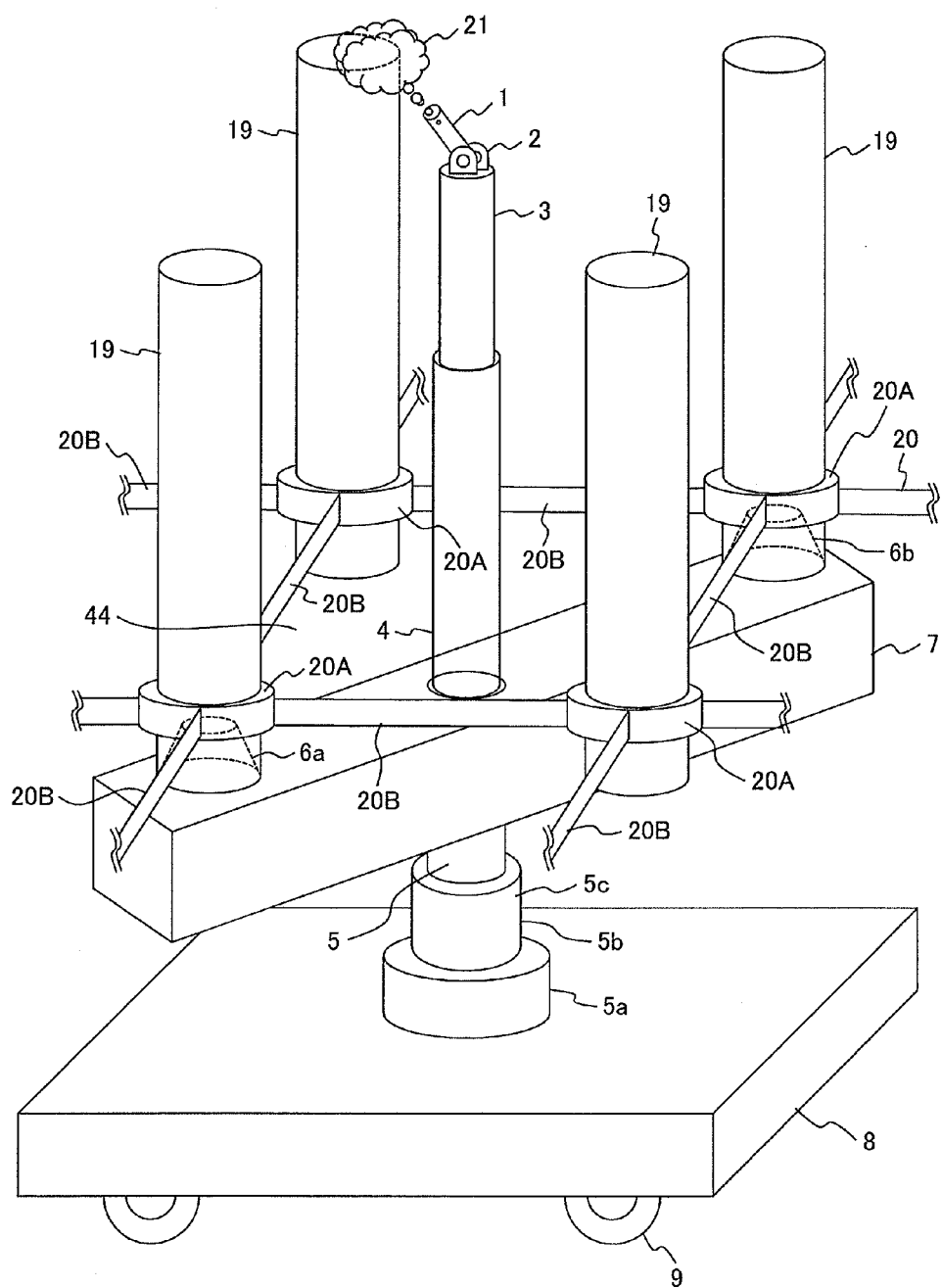
FIG. 5 is an explanatory drawing showing a positional relationship between a WJP apparatus and a plurality of control rod drive mechanism penetration pipes when a method of executing water jet peening according to embodiment 1 is executed.

With regard to each CRDM penetration pipe located in the outermost periphery of the array of CRDM penetration pipes shown in FIG. 4, the water jet 21 can be ejected from the jet nozzle 1 while the axis of the jet nozzle 1 is directed toward the outer surface of the CRDM penetration pipe 19 in the tangential direction; in this way, the above wraparound effect of the cavitation bubbles 33 can be used to execute the WJP to the entire periphery of the CRDM penetration pipe 19. At this time, the WJP can be executed also to the inner surface of the top head 18 by the cavitation bubbles 33 wrapping around.

When the WJP execution is completed for all the CRDM penetration pipes 19 provided to the top head 18, the water 31 in the inner region 42 can be discharged to the water storage tank 12 by opening the pressure adjusting valve 23. The drain hose 15 is removed from the vent pipe 16, and each stop plug 24 is removed from the upper end portion of each CRDM penetration pipe 19. In addition, the underwater camera 36 and the underwater light 35 are taken out through the CRDM penetration pipe 19 through which the cable 38 passes. When the water level of the water 31 in the inner region 42 goes lower than the top end of the tank 17, the top head 18 is removed from the tank 17. After exchange of the fuel assemblies loaded to the core of the reactor pressure vessel is completed, the top head 18 is installed to the reactor pressure vessel.

Even when each of a plurality of CRDM penetration pipes 19 disposed to the top head 18 in a square grid-like pattern is supported by the tube support member 20, the present embodiment can shorten the time required for executing the WJP to each weld between the CRDM penetration pipes 19 and the top head 18. The reason that the present embodiment can shorten the time required for executing WJP will be explained below.

In the present embodiment, the nozzle lifting/lowering apparatus 4 having the jet nozzle 1 and the nozzle turning mechanism 4a is inserted in a rectangular region 44 formed by the tube support member 20 supporting all the CRDM penetration pipes 19, in which state, the jet nozzle 1 ejecting the water jet 21 is turned and the WJP is executed to a weld between each of the four CRDM penetration pipes 19 facing the rectangular region 44 and the top head 18. In this WJP, compressive residual stress is given to the weld to the top head 18 and a heat-affected zone around the weld in the quarter region 40 facing the jet nozzle 1 of the nozzle lifting/lowering apparatus 4 on one CRDM penetration pipe 19 facing one rectangular region 44. Since there are four CRDM penetration pipes 19 facing one rectangular region 44, executing WJP to the quarter region of each of the four CRDM penetration pipes 19 is practically equivalent to executing WJP to the entire periphery of one CRDM penetration pipe 19.

In the present embodiment, when the WJP is executed to practically one CRDM penetration pipe 19 while the nozzle lifting/lowering apparatus 4 is inserted in one rectangular region 44 such as this, the jet nozzle 1 is moved twice in the axial direction of the CRDM penetration pipe 19 from an area below the tube support member 20 to an area above the tube support member 20, that is, before the WJP execution to the four CRDM penetration pipes 19 facing the one rectangular region 44 and after the completion of the WJP. On the other hand, when any method of executing WJP described in the Japanese Patent Laid-Open No. 7(1995)-270590, Japanese Patent Laid-Open No. 9(1997)-136261, Japanese Patent Laid-Open No. 10(1998)-10282, or Japanese Patent Laid-Open No. 2000-308927 is applied to the upper cover, which is the WJP execution objection, of a reactor pressure vessel having a plurality of tubular members supported by a tube support member as above, and WJP is executed to a single tubular member, unlike the present embodiment, the jet nozzle 1 must be moved up and down from the area below the tube support member 20 to the area above the tube support member 20 not only before and after the WJP execution but also at least once during the period when the WJP is executed to the entire periphery of the tubular member. It is unnecessary in the present embodiment to move the jet nozzle 1 up and down as above so that the time required for executing WJP to the CRDM penetration pipes 19, each of which is the tubular member, can be shortened.

In the present embodiment, when the WJP is executed to four CRDM penetration pipes 19 facing one rectangular region 44, the jet nozzle 1 is moved in the axial direction of the CRDM penetration pipe 19 to a position near the weld between the next CRDM penetration pipe 19 and the top head 18 while the jet nozzle 1 ejecting the water jet 21 is turning to the next CRDM penetration pipe 19. This allows continuous WJP execution to the four CRDM penetration pipes 19 facing the rectangular region 44 and further can shorten the time required for executing WJP to the four CRDM penetration pipes 19.

When the WJP is executed to four CRDM penetration pipes 19 facing one rectangular region 44, the positioning members 6a and 6b of the positioning guide 7 are inserted into the lower end portions of a pair of CRDM penetration pipes 19 located on a diagonal line of the rectangular region 44, and the positioning guide 7 holds the nozzle lifting/lowering apparatus 4 in the horizontal direction, so that it can be prevented that the travel apparatus 8 is horizontally shifted due to reactive force of the water jet 21 ejected from the jet nozzle 1. Additionally, it can prevent horizontal displacement of the jet nozzle 1 with respect to the CRDM penetration pipe 19 for executing the WJP, and it can also reduce vibration of the jet nozzle 1 when the water jet 21 is being ejected.

In the present embodiment, the vent pipe 16 provided to the top portion of the top head 18 can be used to discharge cavitation bubbles 33 generated but not collapsed during the WJP execution. This can prevent the bubbles from being collected and forming a space in the top head 18 filled with water 31. This space disturbs WJP execution to the weld between the CRDM penetration pipe 19 and the top head 18. Furthermore, since the vent pipe 16 is originally installed to the top head 18, the top head 18 does not need a new vent pipe for discharging bubbles to be installed to execute WJP.

In the present embodiment, the top head 18 is placed on the upper end of the tank 17 in a state of convex upward, so that the top head 18 removed from the reactor pressure vessel does not have to be turned over upside down as in embodiment 3 described later. Because of this, the time required for moving the detached top head 18 from the reactor pressure vessel to the upper end of the tank 17 can be shortened.

In the present embodiment, the jet nozzle 1 is inserted sequentially into four rectangular regions 44 around one CRDM penetration pipe 19, so that the WJP can be executed to the entire periphery of the CRDM penetration pipe 19. At that time, The WJP can be executed to the other neighboring CRDM penetration pipes 19 around the CRDM penetration pipe 19.

Embodiment 2

Figure 9:
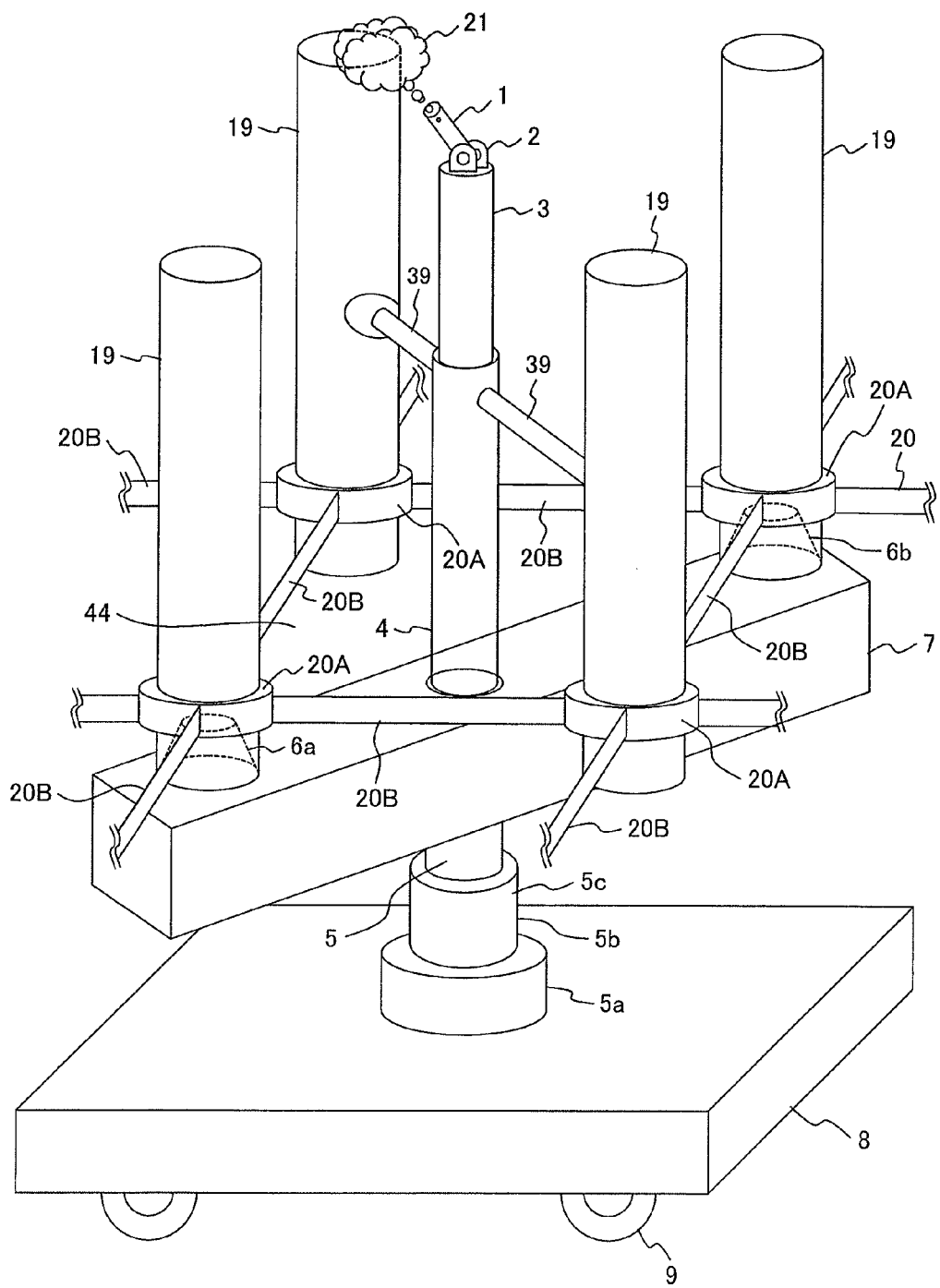
FIG. 9 is a structural view of a water jet peening apparatus used in a method of executing water jet peening according to embodiment 2, which is another preferred embodiment of the present invention.

A method of executing water jet peening according to embodiment 2, which is another preferred embodiment of the present invention, will be described with reference to FIG. 9.

A WJP apparatus 25A used in the method of executing water jet peening according to the present embodiment has a structure of the WJP apparatus 25 in embodiment 1, provided with a pair of clamp mechanisms 39. The other structures of the WJP apparatus 25A are the same as the WJP apparatus 25. The pair of clamp mechanisms 39 is installed to each side surface of the first tubular body of the lifting/lowering mechanism 4a composing the nozzle lifting/lowering apparatus 4. These clamp mechanisms 39 are disposed linearly, extend toward opposite directions from the tubular body, and have a structure which allows to expand/contract in the axial direction of the clamp mechanisms 39. The extending direction of the pair of clamp mechanisms 39 is orthogonal to the longitudinal direction of the positioning guide 7.

The method of executing water jet peening in the present embodiment using the WJP apparatus 25A is the same as the method of executing water jet peening in embodiment 1 using the WJP apparatus 25. The method of executing water jet peening in the present embodiment is different from the method of executing water jet peening in embodiment 1 in only one point, which is the nozzle lifting/lowering apparatus 4 supported not only by the positioning guide 7 but also by the pair of clamp mechanisms 39 during the WJP execution to the CRDM penetration pipes 19 in the present embodiment.

In the present embodiment, in the same manner as in embodiment 1, when the turning center of the nozzle turning mechanism 3 (the axis of the nozzle lifting/lowering apparatus 4) is positioned directly below the intersection of two diagonal lines of a target rectangular region 44 by moving the travel apparatus 8, the lifting/lowering mechanism 4a is operated and the jet nozzle 1 is lifted to a place near a weld between one of the CRDM penetration pipes 19 and the top head 18 above the tube support member 20 forming the rectangular region 44. When the jet nozzle 1 is being moved, the pair of clamp mechanisms 39 is contracted so that these clamp mechanisms 39 can easily pass through the rectangular region 44. The positioning members 6a and 6b of the positioning guide 7 are, in the same manner as in embodiment 1, inserted into the lower end portions of two CRDM penetration pipes 19 facing the rectangular region 44, located on a diagonal line of the rectangular region 44. Then, the pair of clamp mechanisms 39 is extended to contact the side surface of the other pair of CRDM penetration pipes 19 facing the rectangular region 44, located on the other diagonal line orthogonal to the above diagonal line. Each clamp mechanism 39 is pressed against the side surface of the contacting CRDM penetration pipe 19. After that, in the same manner as in embodiment 1, the WJP is executed to each weld between the CRDM penetration pipes 19 and the top head 18.

The present embodiment can obtain each effect generated in embodiment 1. In the present embodiment, the nozzle lifting/lowering apparatus 4 is horizontally supported not only by the positioning guide 7 but also by the pair of clamp mechanisms 39, so that vibration of the jet nozzle 1 caused by reactive force generated by ejecting the water jet 21 can be further reduced than embodiment 1.

Embodiment 3

Figure 10:
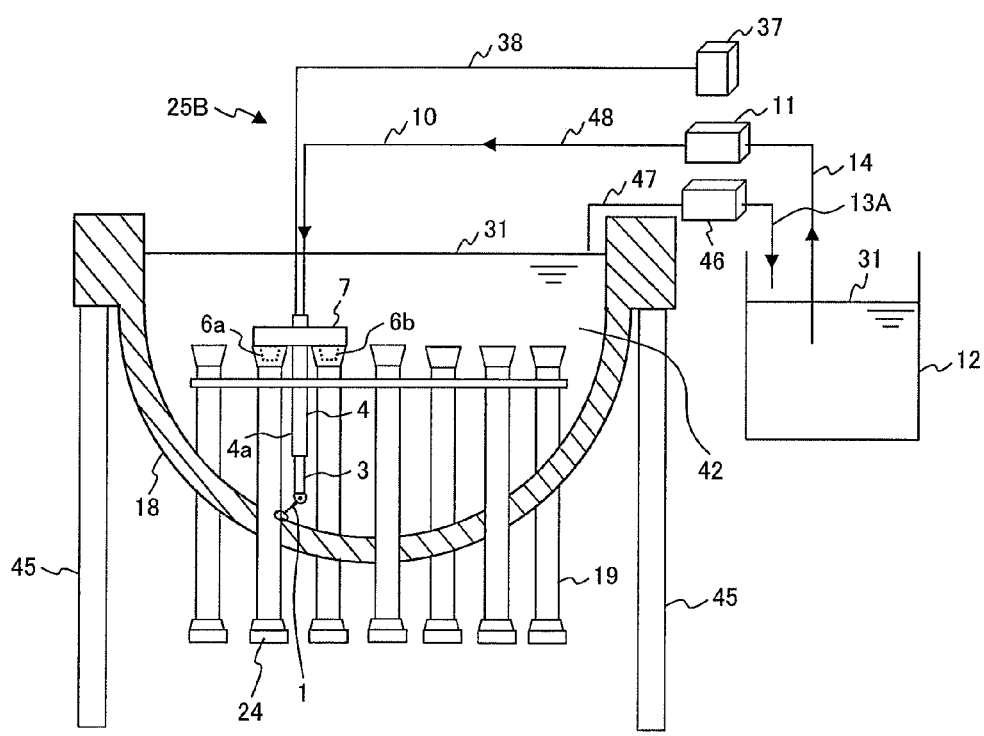
FIG. 10 is a structural view of a water jet peening apparatus used in a method of executing water jet peening according to embodiment 3, which is another preferred embodiment of the present invention.

A method of executing water jet peening according to embodiment 3, which is another preferred embodiment of the present invention, will be described with reference to FIG. 10.

A WJP apparatus 25B used in the method of executing water jet peening according to the present embodiment has a structure in which the drain apparatus 13 in the WJP apparatus 25 is changed to a drain apparatus 13A and the travel apparatus 8 is deleted from the WJP apparatus 25 used in embodiment 1. The drain apparatus 13A includes a drain pipe 47 provided with a drain pump 46. Since the WJP apparatus 25B has no travel apparatus 8 and the positioning guide lifting/lowering apparatus 5b, the nozzle lifting/lowering apparatus 4 has the positioning guide 7, and the first tubular body of the lifting/lowering mechanism 4a of the nozzle lifting/lowering apparatus 4 is installed to the positioning guide 7.

The method of executing water jet peening according to the present embodiment using the WJP apparatus 25B will be described below. The method of executing water jet peening according to the present embodiment is different from the methods of executing water jet peening in embodiments 1 and 2 in that the top head 18 provided with a plurality of CRDM penetration pipes 19 is disposed to make the inner surface of the top head 18 face up (the curved surface of the top head 18 is convex downward). This top head 18 is held on the floor by a plurality of (for example, four) support members 45. In place of the plurality of support members 45, a cylinder may be used as a support member.

The water 31 is supplied into a region inside the upside-down top head 18 (hereinafter referred to as the inner region) 42 from the water tank 12 using a water supply apparatus not shown in the figure, and the inner region 42 is filled with the water 31. When a water level in the inner region 42 measured by a water gauge (not shown) provided to the top head 18 reaches a preset water level, the water 31 is stopped from being supplied into the inner region 42. In this state, the lower end portion of each CRDM penetration pipe 19 provided to the top head 18 is closed by the stop plug 24. Although it is not shown in FIG. 10, the vent pipe 16 stated in embodiment 1 is connected to the top head 18. The opening/closing valve 16b (see FIG. 2) provided to the vent pipe 16 is closed so that no water 31 filled in the top head 18 is discharged from the vent pipe 16.

While the water 31 is filled in the inner region 42, the nozzle lifting/lowering apparatus 4 of the WJP apparatus 25B hung from a ceiling crane (now shown) is moved to a position directly above a rectangular region 44 facing four CRDM penetration pipes 19 for executing the WJP. The nozzle lifting/lowering apparatus 4 hung by the ceiling crane is lowered and the positioning members 6a and 6b of the positioning guide 7 provided to the nozzle lifting/lowering apparatus 4 are inserted into upper end portions of a pair of CRDM penetration pipes 19 facing the rectangular region 44 on a diagonal line of the rectangular region 44. Before long, the lower surface of the positioning guide 7 is placed on the upper end of the pair of CRDM penetration pipes 19.

In order for the jet nozzle 1 to face a weld between one of the CRDM penetration pipes 19 facing the rectangular region 44 and the top head 18, the jet nozzle 1 is lowered by the lifting/lowering mechanism 4a of the nozzle lifting/lowering apparatus 4 and horizontally turned by the nozzle turning mechanism 3, and the angle of the jet nozzle 1 is adjusted vertically by the nozzle angle adjusting mechanism 2. Then, in the same manner as in embodiment 1, the WJP is executed to each of the four CRDM penetration pipes 19 facing the rectangular region 44. Since the water jet 21 is ejected from the jet nozzle 1 during the WJP execution, the liquid level in the top head 18 will rise. Thus, the water gauge measures the water level in the top head 18 and a measured value is inputted into a first control apparatus (not shown), which corresponds to the travel control apparatus 32 in embodiment 1. When an inputted water level measurement value exceeds a preset water level, the first control apparatus activates the drain pump 46. Therefore, the water 31 in the top head 18 is discharged to the water storage tank 12 through the drain pipe 47. This keeps the water level in the top head 18 to the preset water level. The first control apparatus performs the same control operations as the travel control apparatus 32 in embodiment 1 except the travel control operation of the travel apparatus 8.

When the WJP is completed to the four CRDM penetration pipes facing the rectangular region 44, the nozzle lifting/lowering apparatus 4 is lifted by the ceiling crane until the jet nozzle 1 comes to an area higher than the tube support member 20. Afterward, the nozzle lifting/lowering apparatus 4 is moved by the ceiling crane to a position directly above another rectangular region 44, and the nozzle lifting/lowering apparatus 4 is lowered in this rectangular region 44. Then, the WJP is executed to four CRDM penetration pipes 19 facing this rectangular region 44 in the same manner as in embodiment 1. When the WJP is completed to all the CRDM penetration pipes 19, the WJP to the top head 18 is finished.

The present embodiment can also obtain each effect generated in embodiment 1. Since the top head 18 is inverted to be filled with water in the present embodiment, the tank 17 used in the method of embodiment 1 is unnecessary. Because of this, the amount of the water 31 filled in the inner region 42 is less than that in embodiment 1. The present embodiment can further shortened the time required for filling the water 31 into the inner region 42 than embodiment 1.

Since the WJP apparatus 25B used in the present embodiment needs no travel apparatus 8 or the positioning guide lifting/lowering apparatus 5b, it can be downsized smaller than the WJP apparatus 25 used in embodiment 1. In addition, cavitation bubbles not collapsed during the WJP execution rise in the water 31 in the inner region 42 and are released above the inner region 42 which is open. Thus, the drain hose 15 used in embodiment 1 becomes unnecessary.

REFERENCE SIGNS LIST

1: jet nozzle, 2: nozzle angle adjusting mechanism, 3: nozzle turning mechanism, 4: nozzle lifting/lowering apparatus, 4a, 5c: lifting/lowering mechanism, 5b: positioning guide lifting/lowering apparatus, 6a, 6b: positioning member, 7: positioning guide, 8: travel apparatus, 10: water supply apparatus, 11: high pressure pump, 12: storage tank, 13, 13A: drain apparatus, 16: vent pipe, 18: top head, 19, 19a-19h: control rod drive mechanism penetration pipe: 20: tube support member, 21: water jet, 25, 25A, 25B: water jet peening apparatus, 29: pump control apparatus, 32: travel control apparatus, 39: clamp mechanism, 44, 44a-44d: rectangular region, 45: support member.

What is claimed is:

1. A method of executing water jet peening comprising:
removing an upper cover from an upper portion of a reactor pressure vessel, the upper cover provided with a plurality of tubular members arranged in a rectangular grid pattern and restrained in horizontal movement by a rectangular lattice forming a tube support member;
filling water in the removed upper cover;
moving a jet nozzle in an axial direction of the tubular members toward an inner surface of the upper cover from the tube support member through a first opening formed by the tube support member; and
then, executing water jet peening sequentially to a set of four tubular members facing the first opening and held by the tube support member, by turning the jet nozzle ejecting a water jet;
wherein the upper cover is installed so that the inner surface faces a container as a supporting member;
the filling of the water in the upper cover is performed by filling the water into an inner region surrounded by the upper cover and the container; and
the jet nozzle is moved in the inner region.

2. The method of executing water jet peening according to claim 1, wherein the moving of the jet nozzle in the axial direction of the tubular members through the first opening is performed by moving the jet nozzle attached to a turning apparatus provided on a lifting and lowering mechanism of a nozzle lifting and lowering apparatus in the axial direction of the tubular members by the lifting and lowering mechanism; and then, the turning of the jet nozzle is performed by the turning apparatus.

3. The method of executing water jet peening according to claim 1, wherein the set of four tubular members is a first set and the water jet peening is a first water jet peening, and, after the water jet peening is completed to the first set of four tubular members facing the first opening, the jet nozzle is moved in the axial direction of the tubular members away from the inner surface of the upper cover toward the tube support member and passed through the first opening; after the jet nozzle is passed through the first opening, the jet nozzle is moved to a position facing a second opening formed by the tube support member; the jet nozzle is moved in the axial direction of the tubular members toward the inner surface of the upper cover through the second opening; and then, by turning the jet nozzle ejecting the water jet, a second water jet peening is sequentially executed to a second set of four tubular members facing the second opening and held by the tube support member.

4. The method of executing water jet peening according to claim 3, wherein, when the first and the second openings are adjacent to each other and the second water jet peening to the second set of four tubular members facing the second opening is executed after first the water jet peening to the first set of four tubular members facing the first opening is completed, the second water jet peening is executed at least to a circumferential region to which the first water jet peening was not executed during the latter first water jet peening.

5. The method of executing water jet peening according to claim 1, wherein, when the jet nozzle ejecting the water jet is turned and the water jet peening is sequentially executed to the four tubular members facing the first opening, the jet nozzle is positioned to an area for executing the water jet peening on the four tubular members.

6. The method of executing water jet peening according to claim 2, wherein a pair of positioning members provided on a positioning guide mounted to a positioning guide lifting and lowering apparatus is inserted into end portions of two of the tubular members facing each other across the first opening; and the water jet peening to each of the four tubular members is executed while the pair of positioning members is inserted into the end portions of the two tubular members.

7. The method of executing water jet peening according to claim 6, further comprising extending clamp mechanisms in opposite directions so as to push against each outer surface of two other tubular members, other than the two tubular members having end portions into which the pair of positioning members is inserted.

8. The method of executing water jet peening according to claim 1, wherein bubbles that are generated during the water jet peening and that reach a location inside the upper cover are discharged outside the upper cover.

* * * * *